United States Patent
Breitner et al.

(10) Patent No.: US 10,557,291 B2
(45) Date of Patent: Feb. 11, 2020

(54) METHOD FOR CONTROLLING A CLOSING PROCESS OF A VEHICLE WING AND CORRESPONDING VEHICLE CLOSING SYSTEM

(75) Inventors: Roland Breitner, Herrenberg (DE); Hans Deischl, Jettingen (DE); Martin Lindmayer, Sulz-Hopfau (DE); Wolfgang Much, Ammerbuch (DE); Dieter Scheunert, Weil im Schoenbuch (DE); Eckart Schuler, Sindelfingen (DE); Falk Zeidler, Sindelfingen (DE)

(73) Assignee: Daimler AG, Stuttgart (DE)

( * ) Notice: Subject to any disclaimer, the term of this patent is extended or adjusted under 35 U.S.C. 154(b) by 1518 days.

(21) Appl. No.: 13/132,700

(22) PCT Filed: Dec. 10, 2009

(86) PCT No.: PCT/EP2009/008841
§ 371 (c)(1),
(2), (4) Date: Jun. 3, 2011

(87) PCT Pub. No.: WO2010/075945
PCT Pub. Date: Jul. 8, 2010

(65) Prior Publication Data
US 2011/0232195 A1    Sep. 29, 2011

(30) Foreign Application Priority Data
Dec. 17, 2008    (DE) .......................... 10 2008 062 641

(51) Int. Cl.
E05B 81/20    (2014.01)
H02P 29/00    (2016.01)

(52) U.S. Cl.
CPC .............. *E05B 81/20* (2013.01); *H02P 29/00* (2013.01)

(58) Field of Classification Search
USPC ......... 318/18, 266, 283, 368, 369, 445, 466, 318/467
See application file for complete search history.

(56) References Cited

U.S. PATENT DOCUMENTS

| 4,889,371 A | 12/1989 | Girard et al. |
| 6,715,806 B2 * | 4/2004 | Arlt .......................... E05B 81/06 292/201 |

(Continued)

FOREIGN PATENT DOCUMENTS

| DE | 20 2004 004 676 U1 | 7/2004 |
| DE | 103 03 778 A1 | 8/2004 |

(Continued)

OTHER PUBLICATIONS

English-language translation of Japanese Office Action dated Feb. 18, 2014, in a corresponding Japanese application (Three (3) pages).

(Continued)

*Primary Examiner* — Eduardo Colon Santana
(74) *Attorney, Agent, or Firm* — Crowell & Moring LLP

(57) ABSTRACT

A method for controlling a closing process of a vehicle wing moving from a known start position into an end position representing as closed, position of the vehicle wing and a corresponding closing system for performing the method, When the start position is reached, the closing process of the vehicle wing is started for a prescribed short first time period, and then interrupted for a prescribed second time period in order to warn users or third parties of the imminent closing process of the vehicle wing.

11 Claims, 1 Drawing Sheet

(56) References Cited

U.S. PATENT DOCUMENTS

Figure 1:
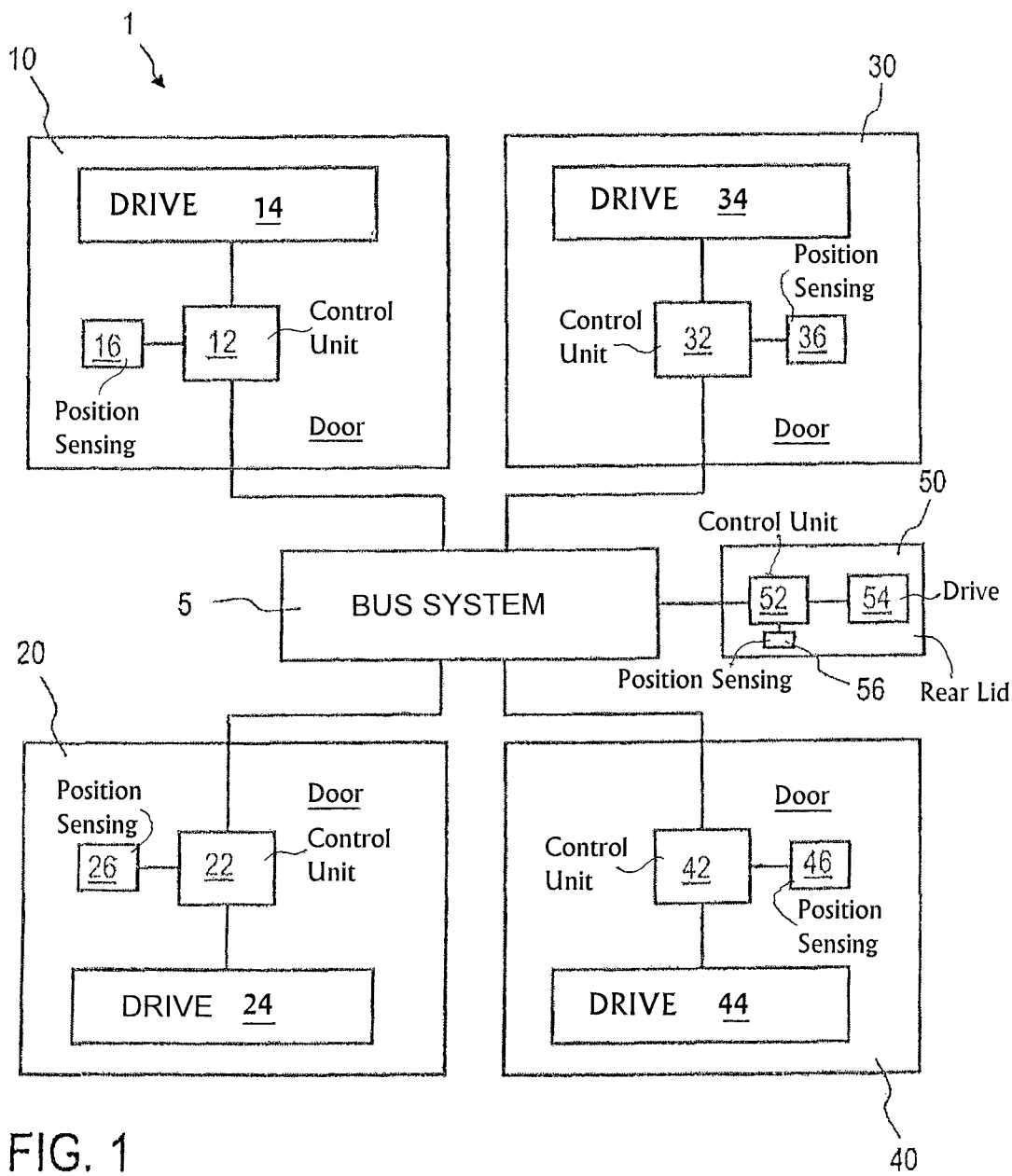

| | | |
|---|---|---|
| 7,248,011 B2 | 7/2007 | Schachtl et al. |
| 2004/0046419 A1 | 3/2004 | Yokomori et al. |
| 2005/0088135 A1* | 4/2005 | Sato .............................. 318/717 |
| 2006/0279243 A1 | 12/2006 | Schachtl et al. |
| 2009/0173006 A1* | 7/2009 | Jitsuishi .............. E05F 15/0004 49/31 |
| 2009/0299580 A1* | 12/2009 | Sakai et al. ..................... 701/49 |

FOREIGN PATENT DOCUMENTS

| | | |
|---|---|---|
| DE | 20 2007 005 992 U1 | 10/2008 |
| EP | 1 441 100 A1 | 7/2004 |
| EP | 1441100 * | 7/2004 |
| JP | 61-244619 A | 10/1986 |
| JP | 10-220108 | 8/1998 |
| JP | 2823553 B2 | 9/1998 |
| JP | 2009-197483 A | 9/2009 |
| WO | WO 2005/005759 A2 | 1/2005 |

OTHER PUBLICATIONS

Corresponding International Search Report (Form PCT/ISA/210) dated Mar. 26, 2010 with English translation, Including Form PCT/ISA/237 (Eleven (11) pages).

Corresponding German Search Report dated Mar. 13, 2009 with English translation (Nine (9) pages).

\* cited by examiner

METHOD FOR CONTROLLING A CLOSING PROCESS OF A VEHICLE WING AND CORRESPONDING VEHICLE CLOSING SYSTEM

BACKGROUND AND SUMMARY OF THE INVENTION

The invention relates to a method for controlling a closing process of a vehicle wing that is moved from a recognized start position into an end position representing a closed position of the vehicle wing, and a corresponding vehicle closing system for implementing the method.

Known methods for controlling a vehicle wing, such as a door or a flap, move the door or the flap from a pre-engagement position or a special start position into a main engagement position or completely closed position of the closure. The open gap of the door or the flap has a different size depending on the vehicle design and on the design of the closure mechanism at the start of the automatic closing process. If the process of closing the vehicle wing in not handled carefully, there is a risk that fingers or limbs can be injured by being jammed between the vehicle wing and the open gap.

German Patent Document DE 103 03 778 B describes an actuating arrangement for opening and closing a vehicle wing. The described actuating arrangement comprises a drive arrangement, by means of which the vehicle wing can be moved between its open and its closed position, and a catch closure, by means of which the vehicle wing is locked in its closed position at the associated opening frame of the body, wherein the closure comprises two cooperating closure parts, which are arranged at the vehicle wing and at the opening frame. A first drive means of the drive arrangement is switched off before the last closing movement phase, whereafter the vehicle wing is further moved into its end position via a second drive means. The second drive means is designed as a motoric drive device, with which one of the closure parts can be moved from an extended catch position into a retracted non-usage position corresponding to the end position of the vehicle wing.

Exemplary embodiments of the present invention provide a method for controlling a closing process of a vehicle wing and a corresponding closing system for carrying out the method, which warn persons, in particular both users and third parties, about the imminent closing process.

According to the invention, the automatic closing process of the vehicle wing is started for a prescribed short first time period when reaching a start position and then interrupted for a prescribed second time period, in order to warn users or third parties about the imminent closing process of the vehicle wing. Using this special type of control of the closing process at the start of the closing or pulling process, the safety of the users or third parties is increased. The short start-up of the closing process serves as a noticeable and perceivable warning notification before the actual closing process, so that fingers or limbs that are possibly unnoticed within the open gap can be withdrawn in time in an advantageous manner before the actual closing process. The first time period is formed so short that only a relatively small closing path is covered, and the second time period is chosen in an advantageous manner that the users or third parties are provided with a sufficient time for removing fingers or other limbs from the open gap. After the expiration of the second time period, the closing process is continued for a third time period, which is considerably longer than the first time period, until the vehicle wing has reached its end position.

In the arrangement of the method according to the invention, the vehicle wing is moved further into the closing position for a prescribed fourth time period, in order to ensure a safe closing of the corresponding vehicle wing.

In a further arrangement of the method according to the invention, the start position represents, for example, a pre-engagement position of a lock of the vehicle wing.

The closing system for a vehicle for carrying out the method according to the invention comprises at least one vehicle wing that is moved by a drive from a recognized start position into an end position representing a closed position of the vehicle wing during a closing process. According to the invention, an evaluation and control unit accesses the drive of a corresponding vehicle wing for a prescribed short first time period into the closing direction when reaching the start position, in order to start the closing process. After the expiration of the short first time period, the evaluation and control unit interrupts the access of the drive for a prescribed second time period, in order to warn users or third parties about the imminent closing process of the vehicle wing. The first time period is advantageously chosen so short that only a relatively short closing path is covered. The second time period is advantageously chosen in such a manner that a sufficient time period is provided to the user or a third party, in order to remove fingers or other limbs therefrom which could be present in the open gap of the vehicle wing. After the expiration of the determined second time period, the evaluation and control unit accesses the drive again into the closing direction, in order to continue the closing process for a third time period, which is considerably longer than the short first time period, until the corresponding vehicle wing has reached its end position. The at least one vehicle wing can be, for example, a vehicle door and/or rear lid or rear door.

In the arrangement of the closing system according to the invention, the evaluation and control unit determines the position of the at least one vehicle wing by evaluating information provided by position sensing means. The position sensing means can comprise, for example, at least one end switch and/or at least one position sensing sensor.

In a further arrangement of the closing system according to the invention, the start position represents a pre-engagement position of a lock of the vehicle wing, and the end position represents a main engagement position of the lock of the vehicle wing. After reaching the end position, the evaluation and control unit can further access the drive of the corresponding vehicle wing for a prescribed fourth time period, in order to convert a safe engagement of the lock into the main engagement position.

BRIEF DESCRIPTION OF THE DRAWING FIGURES

Advantageous embodiments of the invention are illustrated in the drawings and are described in the following.

Figure 2:
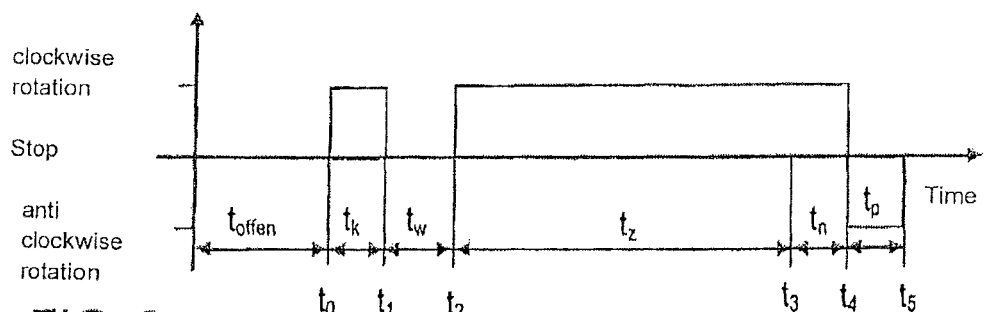

It shows thereby:

FIG. 1 a block diagram of an embodiment of a closing system according to the invention for a vehicle, and FIG. 2 a state diagram for a drive of a vehicle wing.

DETAILED DESCRIPTION

As can be seen from FIG. 1, the shown embodiment of a closing system 1 for a motor vehicle according to the invention has four vehicle wings 10, 20, 30, 40 designed as doors and a vehicle wing 50 designed as a rear lid. Each of the vehicle wings 10, 20, 30, 40, 50 can be moved during a closing process from a recognized start position into an end position representing a closed position using a corresponding drive 14, 24, 34, 44, 54 during a closing process, which is for example designed as an electric motor, a fluid motor etc. In the shown embodiment, the start position is a pre-engagement position of a lock of the vehicle wing 10, 20, 30, 40, 50, and the end position is a main engagement position of the lock of the vehicle wing 10, 20, 30, 40, 50. The closing process of one of the vehicle wings 10, 20, 30, 40, 50 involves a corresponding evaluation and control unit 12, 22, 32, 42, 52 controls the corresponding drive 14, 24, 34, 44, 54 to operate in the closing direction. The associated evaluation and control unit 12, 22, 32, 42, 52 determines a current position of a corresponding vehicle wing 10, 20, 30, 40, 50 by evaluating information provided by position sensing means 16, 26, 36, 46, 56. The position sensing means 16, 26, 36, 46, 56 comprise, for example, end switches, position sensing sensors etc. The evaluation and control units 12, 22, 32, 42, 52 of the vehicle wings 10, 20, 30, 40, 50 are coupled to a bus system 5 and provide the bus, for example, with information regarding a current closing state of the corresponding vehicle wing 10, 20, 30, 40, 50. The evaluation and control units 12, 22, 32, 42, 52 also receive commands and information regarding superordinated systems, as for example an access authorization system, a remote control system etc.

An embodiment of the method according to the invention for controlling the closing process of a vehicle wing 10, 20, 30, 40, 50 is now described while referring to FIGS. 1 and 2. FIG. 2 shows a schematic state diagram for a drive 14, 24, 34, 44, 54 of a vehicle wing 10, 20, 30, 40, 50, wherein reaction times and/or debouncing times of electronic assemblies such as switches, sensors etc. are not considered.

If an open vehicle wing 10, 20, 30, 40, 50, which is represented in FIG. 2 by a time period toffen is closed manually, and the corresponding vehicle wing 10, 20, 30, 40, 50 reaches the start position for the automatic closing and/or pulling process, at a first time t0, the evaluation and control unit 12, 22, 32, 42, 52 controls the drive 14, 24, 34, 44, 54 of the corresponding vehicle wing 10, 20, 30, 40, 50 from the first time t0 to a following second time t1 for a short first time period tk in the closing direction. After the expiration of the short first time period tk, the evaluation and control unit 12, 22, 32, 42, 52 interrupts the closing process at the second time t1 up to a third time t2 for a prescribed second time period tw, in order to warn vehicle users or third parties about the imminent closing process of the vehicle wing 10, 20, 30, 40, 50. At the third time t2, the evaluation and control unit 12, 22, 32, 42, 52 controls the drive 14, 24, 34, 44, 54 again in the closing direction, in order to continue the closing process for a third time period tz, which is considerably longer than the short first time period, until the corresponding vehicle wing 10, 20, 30, 40, 50 has reached its end position at a fourth time t3. In order to convert a safe latching of the lock into the main latching position, the evaluation and control unit 12, 22, 32, 42, 52 controls the drive 14, 24, 34, 44, 54 of the corresponding vehicle wing 10, 20, 30, 40, 50 after reaching the end position at the fourth time period t3 for a prescribed fourth time period tn, which is also called follow-up time, until reaching a fifth time t4 further into the closing direction. With the reaching of the fifth time t4, the evaluation and control unit 12, 22, 32, 42, 52 inverts the movement direction of the drive 14, 24, 34, 44, 54 up to a sixth time t5, in order to move the drive 14, 24, 34, 44, 54 into a defined parking position during the time period tp.

Embodiments of the method according to the invention for controlling a closing process of a vehicle wing and of the closing system according to the invention increase the safety of the user or of the occupants in an advantageous manner, in particular with incorrect handling. The short start-up of the corresponding drive serves as a noticeable and perceivable warning notification before the actual closing process, so that fingers or limbs which are possibly unnoticed within the open gap can be withdrawn in time.

The invention claimed is:

1. A method, comprising:
controlling a closing process of a vehicle wing that is moved from a start position into an end position representing a closed position of the vehicle wing, wherein the start position is a pre-engagement of a lock of the vehicle wing and the end position is a main engagement of the lock of the vehicle wing,
wherein when the start position is reached, the vehicle wing is moved in a closing direction for a predetermined short first time period, and then interrupted for a predetermined second time period in order to warn users or third parties of the imminent closing of the vehicle wing,
wherein the vehicle wing reaches the start position by being manually moved and movement of the vehicle wing from the start position to the end position is automatically performed,
wherein after expiration of the second time period, the closing process is continued for a third time period, which is considerably longer than the short first time period, until the vehicle wing has reached the end position.

2. The method according to claim 1, wherein the vehicle wing, after reaching the end position, is further moved in a closing direction for a predetermined fourth time period, in order to ensure a safe closing of the corresponding vehicle wing.

3. The method according to claim 1, wherein after the vehicle wing reaches the end position a drive controlling movement of the vehicle wing from the start position to the end position inverts its movement direction to move the drive into a parking position.

4. A closing system for a vehicle, comprising:
a vehicle wing;
a drive that controls movement of the vehicle wing during a closing process from a start position into an end position that is a closed position, wherein the start position is a pre-engagement position of a lock of the vehicle wing and the end position is a main engagement position of the lock of the vehicle wing; and
an evaluation and control unit that, when the start position is reached, controls the drive of the vehicle wing for a predetermined short first time period to move in a closing direction, in order to start the closing process, wherein the evaluation and control unit interrupts the movement of the drive after the expiration of the short first time period for a prescribed second time period, in order to warn users or third parties of the imminent closing process of the vehicle wing, wherein the vehicle wing reaches the start position by being manually moved and movement of the vehicle wing from the start position to the end position is automatically performed, wherein the evaluation and control unit controls the drive after the expiration of the second time period to move again in the closing direction, in order to continue the closing process for a third time period, which is considerably longer than the short first time period, until the vehicle wing has reached the end position.

5. The closing system according to claim 4, wherein the evaluation and control unit determines the position of the vehicle wing by evaluating information provided by a position sensing means wherein the position sensing means comprises at least one end switch or at least one position sensing sensor.

6. The closing system according to claim 4, wherein the evaluation and control unit controls the drive of the vehicle wing after reaching the end position for a prescribed fourth time period to move further into the closing direction, in order to convert a safe engagement of the lock into the main engagement position.

7. The closing system of claim 4, wherein the evaluation and control unit is configured to cause the drive to invert the drive's movement direction to move the drive into a parking position after the vehicle wing reaches the end position.

8. The closing system of claim 7, wherein the vehicle wing is a vehicle door or rear lid.

9. A closing system for a vehicle, comprising:
a vehicle wing;
a drive that controls movement of the vehicle wing during a closing process from a start position into an end position that is a closed position, wherein the start position is a pre-engagement position of a lock of the vehicle wing and the end position is a main engagement position of the lock of the vehicle wing; and
an evaluation and control unit that, when the start position is reached, controls the drive of the vehicle wing for a predetermined short first time period to move in a closing direction, in order to start the closing process,
wherein the evaluation and control unit interrupts the movement of the drive after the expiration of the short first time period for a prescribed second time period, in order to warn users or third parties of the imminent closing process of the vehicle wing,
wherein the evaluation and control unit controls the drive after the expiration of the second time period to move again in the closing direction, in order to continue the closing process for a third time period, which is considerably longer than the short first time period, until the vehicle wing has reached the end position,
wherein the vehicle wing is a vehicle door or rear lid.

10. The closing system of claim 9, wherein the vehicle wing reaches the start position by being manually moved and movement of the vehicle wing from the start position to the end position is automatically performed.

11. The closing system of claim 9, wherein the evaluation and control unit is configured to cause the drive to invert the drive's movement direction to move the drive into a parking position after the vehicle wing reaches the end position.

* * * * *